US012235987B2

(12) United States Patent
Zhang et al.

(10) Patent No.: US 12,235,987 B2
(45) Date of Patent: Feb. 25, 2025

(54) METHOD FOR PERFORMING MULTI-SYSTEM LOG ACCESS MANAGEMENT, ASSOCIATED SYSTEM ON CHIP INTEGRATED CIRCUIT AND NON-TRANSITORY COMPUTER-READABLE MEDIUM

(71) Applicant: Realtek Semiconductor Corp., HsinChu (TW)

(72) Inventors: Junchen Zhang, Zhangsha (CN); Mingrui Li, Zhangsha (CN)

(73) Assignee: Realtek Semiconductor Corp., HsinChu (TW)

( * ) Notice: Subject to any disclaimer, the term of this patent is extended or adjusted under 35 U.S.C. 154(b) by 398 days.

(21) Appl. No.: 17/381,187

(22) Filed: Jul. 20, 2021

(65) Prior Publication Data
US 2022/0229932 A1     Jul. 21, 2022

(30) Foreign Application Priority Data
Jan. 21, 2021    (CN) .......................... 202110084079.0

(51) Int. Cl.
*G06F 21/62*     (2013.01)
(52) U.S. Cl.
CPC ................................ *G06F 21/6236* (2013.01)
(58) Field of Classification Search
CPC ....................... G06F 21/6227; G06F 21/6236
See application file for complete search history.

(56) References Cited

U.S. PATENT DOCUMENTS

| | | | |
|---|---|---|---|
| 9,842,075 B1 * | 12/2017 | Davis | G06F 13/4295 |
| 9,996,484 B1 * | 6/2018 | Davis | G06F 13/105 |
| 2007/0156370 A1 * | 7/2007 | White | G06F 1/3203 |
| | | | 702/132 |
| 2008/0027920 A1 | 1/2008 | Schipunov | |
| 2020/0334355 A1 | 10/2020 | Klein | |
| 2022/0137873 A1 * | 5/2022 | Liljedahl | G06F 3/0656 |
| | | | 711/154 |

OTHER PUBLICATIONS

Gunther et al., A Generic Import Framework for Process Event Logs, 2006, Springer Link, pp. 81-92 (Year: 2006).*

\* cited by examiner

*Primary Examiner* — Dao Q Ho
(74) *Attorney, Agent, or Firm* — Winston Hsu (57) ABSTRACT

A method for performing multi-system log access management and an associated SoC IC are provided. The method may include: utilizing multiple partial circuit of at least one processor in the SoC IC to run multiple systems, respectively; utilizing a first partial circuit to execute at least one first log management procedure, to configure at least one memory into multiple ring buffers, to record a set of first logs of a first system running on the first partial circuit into a first ring buffer, and to write multiple sets of logs respectively stored in the multiple ring buffers into a file system; and utilizing at least one second partial circuit to execute at least one second log management procedure, to record at least one set of second logs of at least one second system running on the at least one second partial circuit into at least one second ring buffer.

10 Claims, 6 Drawing Sheets

METHOD FOR PERFORMING MULTI-SYSTEM LOG ACCESS MANAGEMENT, ASSOCIATED SYSTEM ON CHIP INTEGRATED CIRCUIT AND NON-TRANSITORY COMPUTER-READABLE MEDIUM

BACKGROUND OF THE INVENTION

1. Field of the Invention

The present invention relates to a cross-system management on an integrated circuit (IC), and more particularly, to a method for performing multi-system log access management, associated system on chip (SoC) IC and a non-transitory computer-readable medium.

2. Description of the Prior Art

A SoC IC may comprise multiple processors for implementing different functions such as system control, audio-related functions, etc. In various phases of the SoC IC, it may be necessary to record respective logs of the multiple processors. For example, in a design phase, a laboratory pilot run phase, and a production pilot run phase of the SoC IC, a large amount of logs may be required for performing system performance analysis and debugging. In a mass production phase of the SoC IC, logs may also be required for finding out a cause of system crash. As the SoC IC may be equipped with various functions, these processors in the SoC IC may run different systems respectively. However, some problems may occur. For example, the SoC IC may retain only the logs of a single processor among these processors or only the logs of a single system among these systems, and therefore lack a general architecture for obtaining across-system and multi-processor logs. For another example, these processors may respectively output logs to a console, and operating the same console at the same time may require adding a locking mechanism, which may cause these processors to wait for each other and therefore slow-down processing speed of these processors. For yet another example, in a situation where the SoC IC is not connected to the console, or the SoC IC is connected to the console but a console-side host malfunctions, associated analysis cannot be performed. Thus, a novel method and associated architecture are needed for realizing SoC IC equipped with reliable log processing mechanism without introducing any side effect or in a way that is less likely to introduce a side effect.

SUMMARY OF THE INVENTION

It is therefore an objective of the present invention to provide a method for performing multi-system log access management, associated system on chip (SoC) IC and a non-transitory computer-readable medium, in order to solve the above-mentioned problems.

It is another objective of the present invention to provide a method for performing multi-system log access management, associated system on chip (SoC) IC and a non-transitory computer-readable medium, in order to ensure the completeness, correctness and availability of records of log information of multiple systems.

At least one embodiment of the present invention provides a method for performing multi-system log access management, where the method is applicable to a system on chip (SoC) integrated circuit (IC). The method may comprise: utilizing at least one processor of the SoC IC to run multiple systems to control operations of the SoC IC, wherein the at least one processor comprises multiple partial circuits, and the multiple partial circuits respectively run the multiple systems; utilizing a first partial circuit of the multiple partial circuits to execute at least one first log management procedure, to configure at least one memory of the SoC IC into multiple ring buffers respectively corresponding to the multiple partial circuits, to record a set of first logs of a first system running on the first partial circuit into a first ring buffer of the multiple ring buffers, and to write multiple sets of logs respectively stored in the multiple ring buffers into a file system to form at least one log file for access, wherein the multiple systems comprise the first system, and the multiple sets of logs comprise the set of first logs; and utilizing at least one second partial circuit of the multiple partial circuits to execute at least one second log management procedure, to record at least one set of second logs of at least one second system running on the at least one second partial circuit into at least one second ring buffer of the multiple ring buffers, wherein the multiple systems comprise the at least one second system, and the multiple sets of logs comprise the at least one set of second logs.

At least one embodiment of the present invention provides a SoC IC, where the SoC IC is applicable to multi-system log access management. The SoC IC comprises at least one processer and at least one memory. The at least one processer comprises multiple partial circuits, and the multiple partial circuits are configured to respectively run multiple systems to control operations of the SoC IC. The at least one memory is coupled to the at least one processer, and is configured to store information for the SoC IC. A first partial circuit of the multiple partial circuits executes at least one first log management procedure, to configure the at least one memory into multiple ring buffers respectively corresponding to the multiple partial circuits, to record a set of first logs of a first system running on the first partial circuit into a first ring buffer of the multiple ring buffers, and write multiple sets of logs respectively stored in the multiple ring buffers into a file system to form at least one log file for access, wherein the multiple systems comprise the first system, and the multiple sets of logs comprise the set of first logs. At least one second partial circuit of the multiple partial circuits executes at least one second log management procedure, to record at least one set of second logs of at least one second system running on the at least one second partial circuit into at least one second ring buffer of the multiple ring buffers. The multiple systems comprise the at least one second system, and the multiple sets of logs comprise the at least one set of second logs.

At least one embodiment of the present invention provides a non-transitory computer-readable medium storing program codes which cause a SoC IC to perform a multi-system log access management procedure when executing the program codes. At least one processor of the SoC IC runs multiple systems to control operations of the SoC IC. The at least one processor comprises multiple partial circuits, and the multiple partial circuits respectively run the multiple systems. The multi-system log access management procedure comprises: utilizing a first partial circuit of the multiple partial circuits to execute at least one first log management procedure, to configure at least one memory of the SoC IC into multiple ring buffers respectively corresponding to the multiple partial circuits, to record a set of first logs of a first system running on the first partial circuit into a first ring buffer of the multiple ring buffers, and to write multiple sets of logs respectively stored in the multiple ring buffers into a file system to form at least one log file for access, wherein the multiple systems comprise the first system, and the multiple sets of logs comprise the set of first logs; and utilizing at least one second partial circuit of the multiple partial circuits to execute at least one second log management procedure, to record at least one set of second logs of at least one second system running on the at least one second partial circuit into at least one second ring buffer of the multiple ring buffers, wherein the multiple systems comprise the at least one second system, and the multiple sets of logs comprise the at least one set of second logs.

According to some embodiments, in a situation where the at least one processor represents a plurality of processors/processor cores, the multiple partial circuits may represent the plurality of processors/processor cores. For example, the plurality of processors/processor cores may be implemented by way of a plurality of central processing units (CPUs) or a plurality of CPU cores.

One of the advantages of the present invention is that through a carefully designed log processing mechanism, the present invention can provide multi-system architectures, such as multi-core heterogeneous CPU architectures, with cross-system log processing capability, and more particularly, can enhance the overall log processing performance, and can prevent the related art problems such as frequent operation of the console and the degrading of system performance due to the waiting caused by adding lock mechanism.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
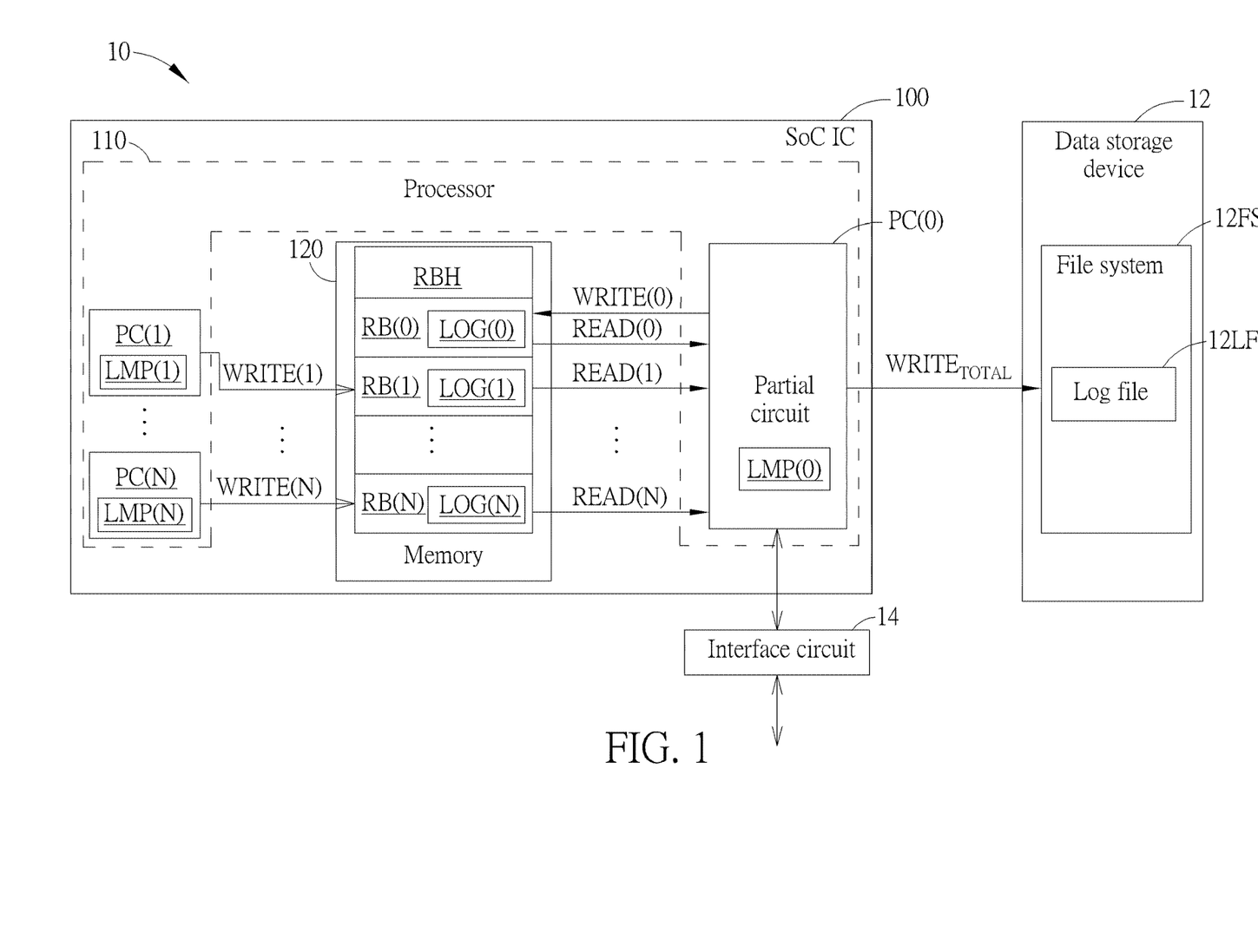
FIG. 1 is a diagram of a system on chip (SoC) integrated circuit (IC) according to an embodiment of the present invention.

FIG. 1 is a diagram of a system on chip (SoC) integrated circuit (IC) 100 according to an embodiment of the present invention, where the SoC IC 100 may be positioned in an electronic device 10, and more particularly, may be mounted on a main board (e.g., a printed circuit board (PCB)) of the electronic device 10, but the present invention is not limited thereto. As shown in FIG. 1, in addition to the SoC IC 100, the electronic device 10 may comprise a data storage device 12 and an interface circuit 14, and the data storage device 12 may comprise a file system 12FS. In addition, the SoC IC 100 may comprise at least one processor (e.g., one or more processors), collectively referred to as the processor 110, and may further comprise at least one memory (e.g., one or more memories) coupled to the processor 110, collectively referred to as the memory 120, where the processor 110 may comprise multiple partial circuits {PC} such as (N+1) partial circuits PC(0), PC(1), . . . and PC(N) for respectively running multiple systems such as systems #0, #1, . . . and #N, where the symbol { } may represent a set. These partial circuits {PC} such as the (N+1) partial circuits PC(0), PC(1), . . . and PC(N) can operate independently and can be regarded as multiple partial processing circuits such as (N+1) partial processing circuits, and more particularly, can execute the systems #0, #1, . . . , and #N for the SoC IC 100 respectively. For better comprehension, the systems #0, #1, . . . , and #N can respectively represent multiple operating systems (OSs).

Under the control of at least one program module (e.g., one or more program modules) running on the processor 110, the processor 110 may configure the memory 120 (e.g., multiple storage regions thereof) into multiple ring buffers {RB} such as (N+1) ring buffers RB(0), RB(1), . . . and RB(N) and a ring buffer header region RBH, and perform multiple log access operations. For example, these log access operations may comprise:

(1) the write operations WRITE(0), WRITE(1), . . . and WRITE(N) that the partial circuits PC(0), PC(1), . . . and PC(N) perform on the ring buffers RB(0), RB(1), . . . and RB(N) respectively, where these write operations can be log write operations;

(2) the read operations READ(0), READ(1), . . . and READ(N) that the partial circuit PC(0) performs on the ring buffers RB(0), RB(1), . . . and RB(N) respectively, where these read operations can be log read operations; and (3) the write operation $WRITE_{TOTAL}$ that the partial circuit PC(0) performs on the file system 12FS in the data storage device 12, where this write operation can also be a log write operation, and can be a file write operation such as a log file write operation since the associated log information is written to the file system 12FS; but the present invention is not limited thereto.

Based on the architecture shown in FIG. 1, the SoC IC 100 can perform multi-system log access management. The multiple partial circuits {PC} such as the (N+1) partial circuits PC(0), PC(1), . . . and PC(N) can run the systems #0, #1, . . . and #N respectively to control the operations of the SoC IC 100, and the aforementioned at least one memory such as the memory 120 can be arranged to store information for the SoC IC 100, where at least two systems of the systems #0, #1, . . . , and #N are typically different from each other, and more particularly, belong to different types of systems, respectively. For example, the systems #0, #1, . . . , and #N may respectively correspond to multiple functions of the electronic device 10, such as functions #0, #1, . . . , and #N, where the function #0 may comprise system control, and the functions #1, . . . and #N may comprise audio processing, video processing, communications processing, positioning processing, etc., but the present invention is not limited thereto.

A first partial circuit of the multiple partial circuits {PC}, such as the partial circuit PC (0), can be configured into a main partial circuit to perform overall control of the multi-system log access management. More particularly, the partial circuit PC(0) can execute at least one first log management procedure such as the log management procedure LMP(0) to perform the following operations:

(1) the memory 120 is configured into the (N+1) ring buffers RB(0), RB(1), . . . and RB(N) respectively corresponding to the (N+1) partial circuits PC(0), PC(1), . . . and PC(N);

(2) in a first ring buffer of the (N+1) ring buffers RB(0), RB(1), . . . and RB(N), such as the ring buffer RB(0), a set of first logs of a first system (where the system #0, #1, . . . , and #N comprise the first system, for example, the system #0) running on the first partial circuit is recorded, such as a set of logs LOG(0) of the system #0 running on the partial circuit PC(0); and (3) (N+1) sets of logs LOG(0), LOG(1), . . . , and LOG(N) respectively stored in the (N+1) ring buffers are written into the file system 12FS to form at least one log file 12LF for further use (for example, for being accessed by a user/other processor according to at least one instruction and displayed on the display, allowing the user/other processor to perform procedures of control, optimization, reset, debugging, etc. on the multiple partial circuits {PC} according to the contents of the respective logs), where the (N+1) sets of logs LOG(0), LOG(1), . . . , and LOG(N) comprise the set of first logs such as the set of logs LOG(0).

In addition, at least one second partial circuit of the multiple partial circuits {PC}, such as the partial circuit PC(n) (for example, the symbol "n" can represent any positive integer in the interval [1, N]), can execute at least one second log management procedure such as the log management procedure LMP(n), to record at least one set of second logs (e.g., a set of logs LOG(n)) of at least one second system (where the at least one second system is comprised in the systems #0, #1, . . . , and #N, for example, the system #n) running on the at least one second partial circuit (e.g., the partial circuit PC(n)), in at least one second ring buffer of the (N+1) ring buffers RB(0), RB(1), . . . and RB(N), such as the ring buffer RB(n), and the (N+1) sets of logs LOG(0), LOG(1), . . . and LOG(N) comprise the at least one set of second logs such as the set of logs LOG(n). For example, the N partial circuits PC(1), . . . and PC(N) can execute the N log management procedures LMP(1), . . . and LMP(N), respectively, to record the N sets of logs LOG(1), . . . and LOG(N) of the N systems #1, . . . , and #N running on the N partial circuits PC(1), . . . and PC(N) in the N ring buffers RB(1), . . . and RB(N), respectively.

For better comprehension, the multiple partial circuits {PC} such as the (N+1) partial circuits PC(0), PC(1), . . . and PC(N) can be implemented by way of processors/processor cores such as central processing units (CPUs)/CPU cores, etc. In this situation, the aforementioned at least one processor such as the processor 110 may comprise a plurality of processors/processor cores such as a plurality of CPU/CPU cores.

Figure 2:
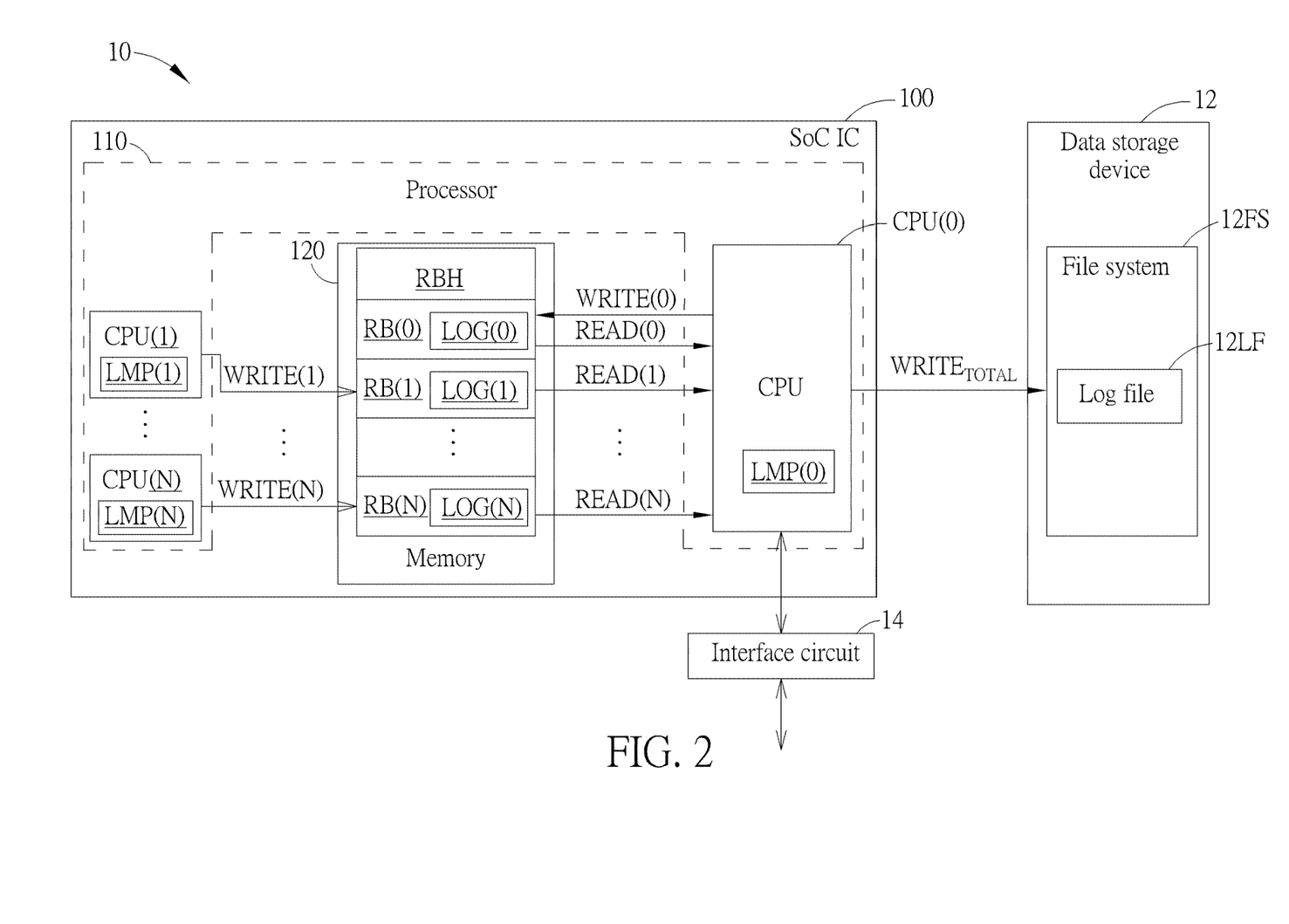
FIG. 2 is a diagram illustrating some implementation details of the SoC IC shown in FIG. 1 according to an embodiment of the present invention.

FIG. 2 is a diagram illustrating some implementation details of the SoC IC 100 shown in FIG. 1 according to an embodiment of the present invention. In this embodiment, the (N+1) partial circuits PC(0), PC(1), . . . and PC(N) shown in FIG. 1 can be implemented as (N+1) CPUs such as CPU(0), CPU (1), . . . and CPU(N), where a certain CPU of the above CPUs, such as the CPU(0), can be a main CPU among these CPUs. For brevity, similar descriptions for this embodiment are not repeated in detail here.

Figure 3:
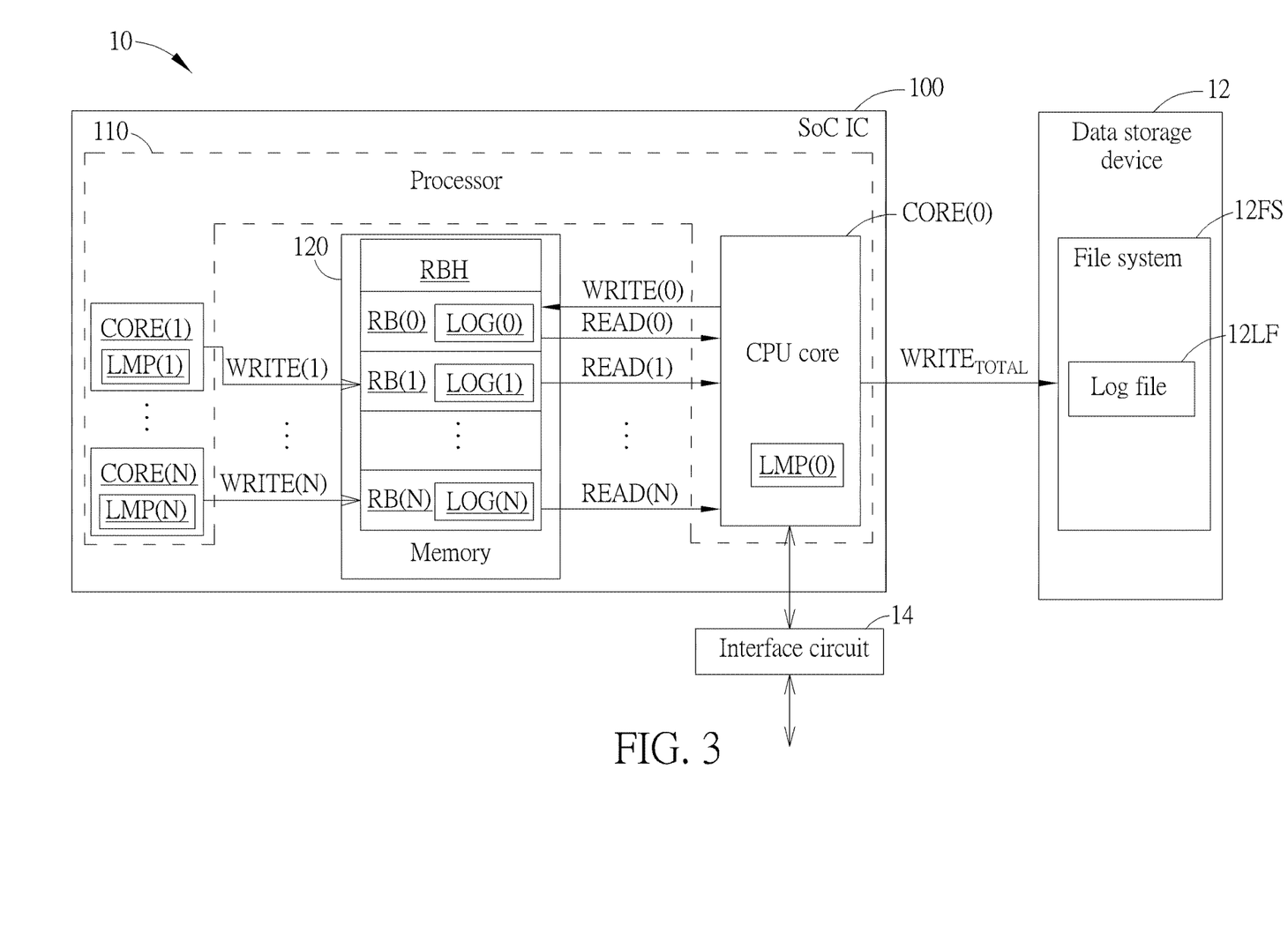
FIG. 3 is a diagram illustrating some implementation details of the SoC IC shown in FIG. 1 according to another embodiment of the present invention.

FIG. 3 is a diagram illustrating some implementation details of the SoC IC 100 shown in FIG. 1 according to another embodiment of the present invention. In this embodiment, the (N+1) partial circuits PC(0), PC(1), . . . and PC(N) shown in FIG. 1 can be implemented as (N+1) CPU cores such as CORE(0), CORE(1), . . . and CORE(N), where a certain COU core of the above CPU cores, such as the CORE(0), can be a main CPU core among these CPU cores. For brevity, similar descriptions for this embodiment are not repeated in detail here.

Based on the architecture shown in FIG. 1, the electronic device 10 (e.g., the SoC IC 100, the data storage device 12, etc. therein) can operate according to a method for performing the multi-system log access management, where the method is applicable to the electronic device 10, and more particularly, the SoC IC 100, the data storage device 12, etc. therein. The method may comprise: utilizing the processor 110 to run the systems #0, #1 . . . and #N (e.g., "N" represents a positive integer) to control the operations of the SoC IC 100; utilizing the first partial circuit such as the partial circuit PC(0) (which can be implemented as the CPU CPU(0) in FIG. 2 or the CPU core CORE(0) in FIG. 3) to execute the at least one first log management procedure such as the log management procedure LMP(0), to configure the memory 120 into the (N+1) ring buffers RB(0), . . . and RB(N) respectively corresponding to the (N+1) partial circuits PC(0), . . . and PC(N) (which can be implemented as the CPUs CPU(0), . . . and CPU(N) in FIG. 2 or the CPU cores CORE(0), . . . and CORE(N) in FIG. 3), and record the set of log LOG(0) of the system #0 running on the partial circuit PC(0) into the ring buffer RB(0), and write the (N+1) sets of logs LOG(0), . . . and LOG(N) respectively stored in the (N+1) ring buffers into the file system 12FS to form the log file 12LF for further use; and utilizing the at least one second partial circuit such as one or more partial circuits {PC(n)} (which can be implemented as one or more CPUs {CPU(n)} in FIG. 2 or one or more CPU cores {CORE(n)} in FIG. 3, where the rest can be deduced by analogy in the subsequent embodiments) (e.g., "n" can represent any positive integer in the interval [1, N]) to execute the at least one second log management procedure such as one or more log management procedures {LMP(n)}, to record the at least one set of second logs (for example, the set of logs LOG(1), if N=1; for another example, the N sets of logs LOG(1), . . . and LOG(N), if N>1) of the at least one second system (e.g., the system #1, if N=1; for another example, the system #1 to the system #N, if N>1) running in the at least one second partial circuit (e.g., the one or more partial circuits {PC(n)}) into the least one second ring buffer such as one or more ring buffers {RB(n)}.

In addition, the electronic device 10 (e.g., the SoC IC 100, the data storage device 12, etc. therein) can be configured according to this method to be equipped with multiple log processing pipelines. Under the control of the at least one program module (for example, the at least one first log management procedure and the at least one second log management procedure, such as log management procedures LMP(0), . . . and LMP(N)) running on the processor 110, the processor 110 can configure the architecture of the SoC IC 100 (for example, the (N+1) partial circuits PC(0), . . . and PC(N), the (N+1) ring buffers RB(0), . . . and RB(N), and the internal connection structure such as data processing paths) into a multi-pipeline architecture. For example, the associated configuration operations in this method may comprise:

(1) the at least one first log management procedure such as the log management procedure LMP(0) is utilized to configure a first data processing path which is connected from the first partial circuit to the first ring buffer, such as a data processing path (for example, the data processing path corresponding to the write operation WRITE(0)) which is connected from the partial circuit PC(0) to the ring buffer RB(0), into a first log writing pipeline, such as a log writing pipeline corresponding to the set of logs LOG(0);

(2) the at least one second log management procedure such as the one or more log management procedures {LMP(n)} is utilized to configure at least one second data processing path which is connected from the at least one second partial circuit to the at least one second ring buffer, such as one or more data processing paths (e.g., one or more data processing paths corresponding to one or more write operations {WRITE(n)}) which is respectively connected from the one or more partial circuits {PC(n)} to the one or more ring buffers {RB(n)}, into at least one second log writing pipeline, such as one or more log writing pipelines corresponding to one or more sets of logs (for example, one set of logs LOG(1), if N=1; for another example, the N sets of logs LOG(1), . . . and LOG(N), if N>1);

(3) the at least one first log management procedure such as the log management procedure LMP(0) is utilized to configure multiple other data processing paths which is connected from the multiple ring buffers {RB} to the first partial circuit, such as the (N+1) data processing paths (e.g., the (N+1) data processing paths corresponding to the (N+1) read operations READ(0), . . . and READ(N)) which are respectively connected from the (N+1) ring buffers RB(0), . . . and RB(N) to the partial circuit PC(0), into multiple log reading pipelines, such as (N+1) log reading pipelines respectively corresponding to the (N+1) sets of logs LOG(0), . . . and LOG(N); and (4) the at least one first log management procedure such as the log management procedure LMP(0) is utilized to configure a subsequent data processing path which is from the first partial circuit such as the partial circuit PC(0) toward the file system 12FS, together with an extended data processing path which is extended from the subsequent data processing path to the file system 12FS, into a log exporting pipeline, where the total output processing path from the partial circuit PC(0) to the file system 12FS may comprise the subsequent data processing path and the extended data processing path, and can be labeled with the write operation WRITE$_{TOTAL}$ thereon for better comprehension;

wherein, based on the pipeline processing between the multiple partial circuits {PC} and the multiple ring buffers {RB}, the data amount of the (N+1) sets of logs LOG(0), . . . and LOG(N) buffered in the multiple ring buffers {RB} may vary with respect to time, and more particularly, may dynamically change over time.

According to some embodiments, the electronic device 10 (e.g., the SoC IC 100, the data storage device 12, etc.) can record the overall management information regarding the (N+1) sets of logs LOG(0), . . . and LOG(N) according to this method, to store the (N+1) sets of logs LOG(0), . . . and LOG(N) together with the overall management information thereof into the log file 12LF, where the overall management information regarding any log (e.g., each log) of any set of logs(e.g., each set of logs) of the (N+1) sets of logs LOG(0), . . . and LOG(N) may comprise a serial number or a timestamp, etc. For example, the set of first logs such as the set of logs LOG(0) may comprise the serial number of each log in this set of logs, the timestamp of each log in this set of logs and the log content of each log in this set of logs, and any set of second logs of the at least one set of second logs (for example, one set of logs LOG(1), if N=1; for another example, the N sets of logs LOG(1), . . . and LOG(N), if N>1) may comprise the serial number of each log in the any set of second logs, the timestamp of each log in the any set of second logs, and the log content of each log of the any set of second logs. In addition, the respective timestamps of all the logs in the (N+1) sets of logs LOG(0), . . . , and LOG(N) are generated according to an identical clock to indicate the relative timing between the (N+1) sets of logs LOG(0), . . . and LOG(N), where this clock can represent a certain clock that is positioned in the electronic device 10 and shared by the (N+1) partial circuits PC(0), . . . , and PC(N) (e.g., the systems #0, . . . , and #N respectively running thereon). For example, the clock can be positioned or installed in the SoC IC 100. For another example, the clock can be positioned or installed outside the SoC IC 100.

Figure 4:
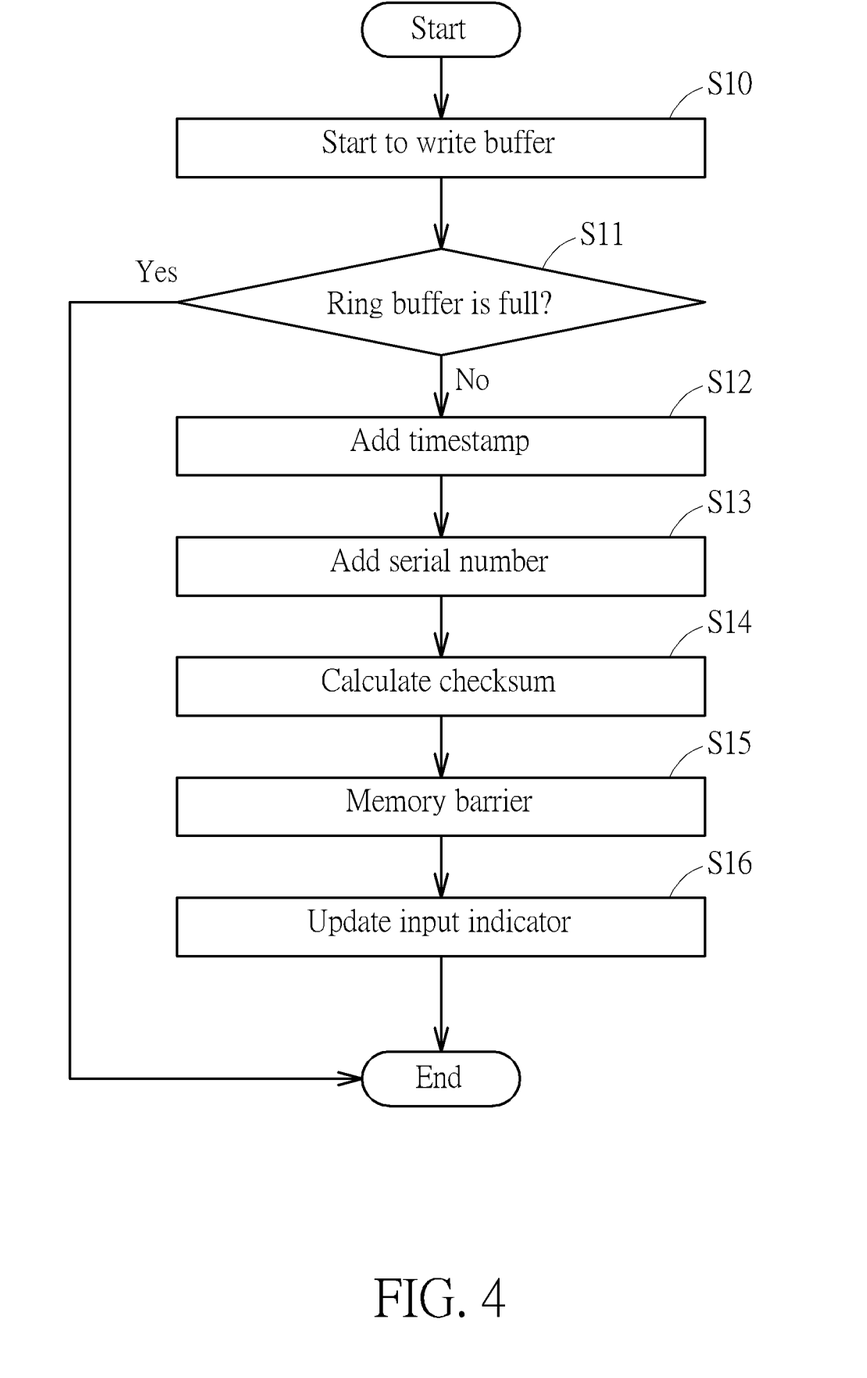
FIG. 4 is a diagram illustrating a partial log processing control scheme of a method for performing multi-system log access management according to an embodiment of the present invention.

FIG. 4 is a diagram illustrating a partial log processing control scheme of the method according to an embodiment of the present invention. For better comprehension, the symbol "n0" can represent a non-negative integer in the interval [0, N]. Any partial circuit PC(n0) of the (N+1) partial circuits PC(0), . . . , and PC(N) in the embodiment of FIG. 1, such as the CPU CPU(n0) in the embodiment of FIG. 2 or the CPU core CORE(n0) in the embodiment of FIG. 3, can operate according to the partial log processing control scheme under the control of the log management procedure LMP(n0), to write a log of a set of logs LOG(n0) in the ring buffer RB(n0), where the log can be regarded as a log entry.

In Step S10, the partial circuit PC(n0) can start to write the corresponding buffer such as the ring buffer RB(n0), and more particularly, write the log content (e.g., the event information corresponding to the event represented by this log) of this log in the ring buffer RB(n0) (for example, the set of logs LOG(n0) buffered thereby).

In Step S11, the partial circuit PC(n0) can check whether the ring buffer RB(n0) is full (labeled "Ring buffer is full?" in FIG. 4 for brevity). If the checking result is Yes, the working flow of the partial log processing control scheme is ended (e.g., an error handling procedure can be entered to handle this situation); if No, Step S12 is entered.

In Step S12, according to the current time of the above-mentioned clock, the partial circuit PC(n0) can add a timestamp of this log into the ring buffer RB(n0) (e.g., the set of logs LOG(n0) buffered thereby), where the timestamp can indicate the current time.

In Step S13, the partial circuit PC(n0) can add a serial number of this log into the ring buffer RB(n0) (e.g., the set of logs LOG(n0) buffered thereby). For example, a series of serial numbers of the set of logs LOG(n0) may represent the order of all logs of the set of logs LOG(n0), and this serial number in the series of serial numbers can indicate the relative order of this log relative to other logs.

In Step S14, the partial circuit PC(n0) can calculate a checksum of the log content of this log, and more particularly, write the checksum in the ring buffer RB(n0) (e.g., the set of logs LOG(n0) buffered thereby) to be integrity check information of this log.

In Step S15, the partial circuit PC(n0) can perform control regarding memory barrier, for example, send a data synchronization barrier (DSB) instruction.

In Step S16, the partial circuit PC(n0) can update an input indicator of the ring buffer RB(n0), wherein the input indicator can indicate a latest input position (e.g., the current writing position such as the position of the current writing) of the ring buffer RB(n0).

For better comprehension, the method may be illustrated with the working flow shown in FIG. 4, but the present invention is not limited thereto. According to some embodiments, one or more Steps may be added, deleted, or changed in the working flow shown in FIG.

Figure 5:
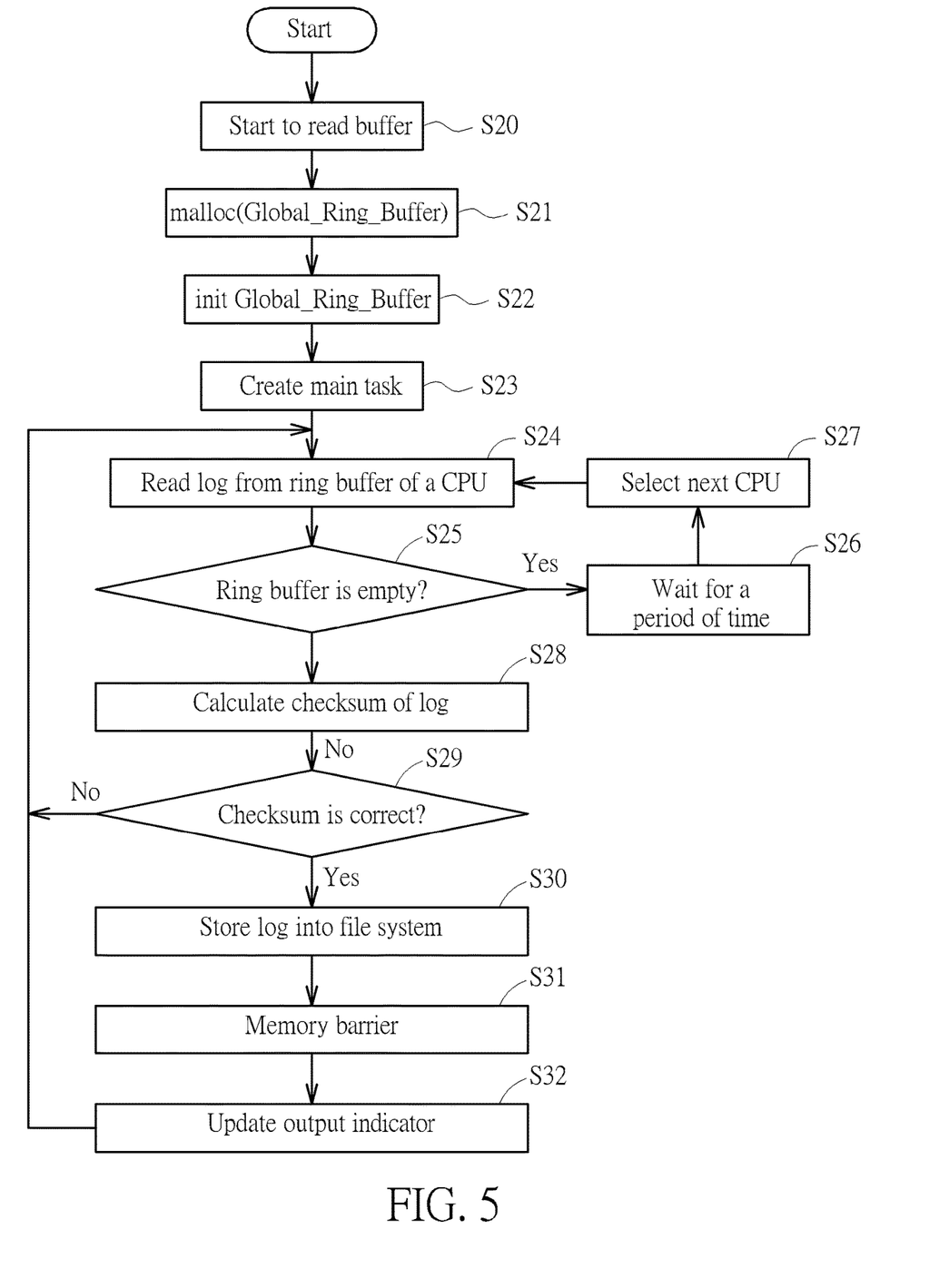
FIG. 5 is a diagram illustrating a global log processing control scheme of the method according to an embodiment of the present invention.

FIG. 5 is a diagram illustrating a global log processing control scheme of the method according to an embodiment of the present invention. The partial circuit PC(0) (e.g., the CPU CPU(0) in FIG. 2 or the CPU core CORE(0) in FIG. 3) can operate according to the global log processing control scheme under the control of the log management procedure LMP(0), to read one or more logs in the set of logs LOG(n0) from the ring buffer {RB(n0)}.

In Step S20, the partial circuit PC(0) can start to read the buffer, for example, start to execute a main control procedure corresponding to the global log processing control scheme. Afterward, Step S21 is entered.

In Step S21, the partial circuit PC(0) can perform memory allocation to obtain memory space for the use of a global ring buffer Global_Ring_Buffer (labeled "malloc(Global_Ring_Buffer)" in FIG. 5 for brevity). Afterward, Step S22 is entered.

In Step S22, the partial circuit PC(0) can initialize the global ring buffer Global_Ring_Buffer (labeled "init Global_Ring_Buffer" in FIG. 5 for brevity), where the global ring buffer Global_Ring_Buffer can comprise the ring buffer header region RBH and the (N+1) ring buffers RB(0), . . . and RB(N). For example, the partial circuit PC(0) can record the respective ring buffer management information of the (N+1) ring buffers RB(0), . . . and RB(N) into the ring buffer header region RBH, to indicate the respective users (for example, the partial circuit PC(0), . . . and PC(N)) of the (N+1) ring buffers RB(0), . . . and RB(N) and the respective sizes of the (N+1) ring buffers RB(0), . . . and RB(N). Afterward, Step S23 is entered.

In Step S23, the partial circuit PC(0) can create a main task to control operations of subsequent steps. For example, the log management procedure LMP(0) may comprise the main control procedure and the main task, but the present invention is not limited thereto. Afterward, Step S24 is entered.

In Step S24, the partial circuit PC(0) can try to read a log from the ring buffer RB(n0) of the partial circuit PC(n0) such as a CPU (e.g., the CPU CPU(n) in FIG. 2)/CPU core (e.g., the CPU core CORE(n) in FIG. 3) (labeled "Read log from a CPU's ring buffer" in FIG. 5 for brevity). Afterward, Step S25 is entered.

In Step S25, the partial circuit PC(0) can check whether the ring buffer RB(n0) is empty (labeled "Ring buffer is empty?" in FIG. 5 for brevity). If Yes, Step S26 is entered; if No, Step S28 is entered.

In Step S26, the partial circuit PC(0) can wait for a period of time, and more particularly, sleep fora period of time. Afterward, Step S27 is entered.

In Step S27, the partial circuit PC(0) can select the next partial circuit such as the next CPU/CPU core (labeled "Select next CPU" in FIG. 5 for brevity), in order to select all partial circuits such as all CPUs/CPU cores in turn, for checking all of the partial circuits. Afterward, return to Step S24.

In Step S28, according to the log content of this log, the partial circuit PC(0) can calculate the checksum of this log. Afterward, Step S29 is entered.

In Step S29, the partial circuit PC(0) can check whether the checksum calculated in Step S28 is equal to the checksum recorded in this log (labeled "Checksum is correct?" in FIG. 5 for brevity). If Yes, Step S30 is entered; if No, Step S24 is entered.

In Step S30, the partial circuit PC(0) can store this log into the file system 12FS (e.g., the log file 12LF). Afterward, Step S31 is entered.

In Step S31, the partial circuit PC(n0) can perform the control regarding the memory barrier, for example, send the DSB instruction. Afterward, Step S32 is entered.

In Step S32, the partial circuit PC(0) can update an output indicator of the ring buffer RB(n0), where the output indicator can indicate a latest output position (for example, the current reading position such as the position of the current reading) of the ring buffer RB(n0). Afterward, return to Step S24.

For better comprehension, the method may be illustrated with the working flow shown in FIG. 5, but the present invention is not limited thereto. According to some embodiments, one or more Steps may be added, deleted, or changed in the working flow shown in FIG. 5.

Figure 6:
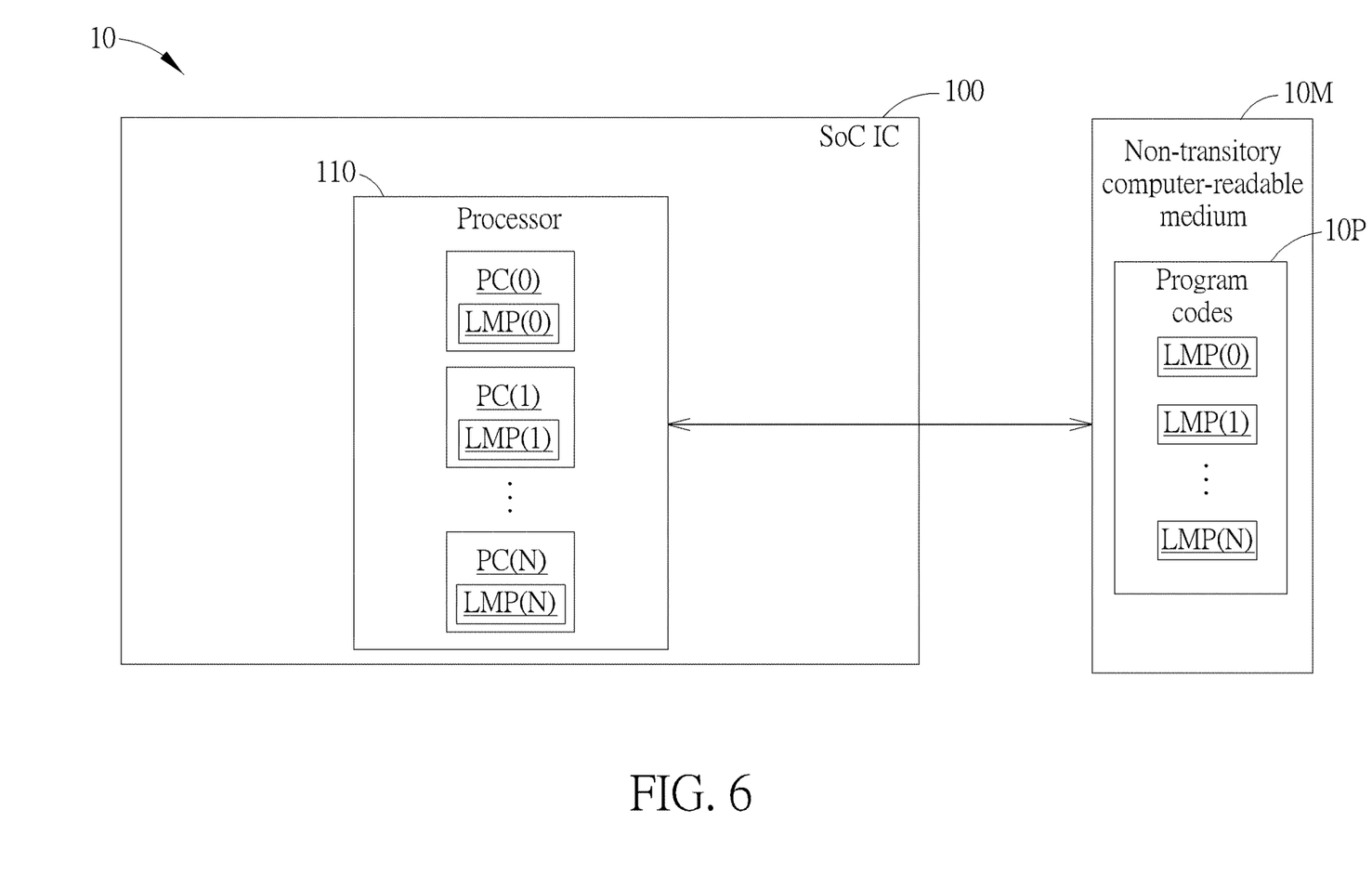
FIG. 6 is a diagram illustrating a non-transitory computer-readable medium involved with the method according to an embodiment of the present invention.

FIG. 6 is a diagram illustrating a non-transitory computer-readable medium 10M involved with the method according to an embodiment of the present invention, where the non-transitory computer-readable medium 10M stores the program codes 10P which cause the SoC IC 100 to perform a multi-system log access management procedure such as the multi-system log access management (e.g., the various operations described in the above embodiments) when executing the above-mentioned program codes 10P. For better comprehension, the program codes 10P can be illustrated as comprising the log management procedures LMP (0), . . . , and LMP(N), but the present invention is not limited thereto. In addition, the program codes 10P can be loaded onto the processor 110 to become the at least one program module running on the processor 110. The non-transitory computer-readable medium 10M may represent a certain storage device/component of the electronic device 10 (e.g., the data storage device 12 shown in FIG. 1 or any of other storage devices/components). The storage device/component can be implemented by way of a hard disk drive (HDD), a solid state drive (SSD), a Universal Flash Storage (UFS) device, a non-volatile memory (NVM) component (e.g., an electronically-erasable programmable read-only memory (EEPROM) and a flash memory), etc., but the present invention is not limited thereto. For brevity, similar descriptions for this embodiment are not repeated in detail here.

Through the carefully designed log processing mechanism, the present invention can make multi-system architectures such as multi-core heterogeneous CPU architectures be equipped with the cross-system log processing capability, and more particularly, enhance the overall log processing performance. For example, the method and the SoC IC of the present invention can control all partial circuits in the multiple partial circuits (e.g., all processors/processor cores in the plurality of processors/processor cores, such as all CPUs in the plurality of CPUs, or all CPU cores in the plurality of CPU cores) to output the respective logs thereof to the multiple ring buffers, rather than directly outputting the logs to a console, and can utilize the first partial circuit (e.g., a main processor/processor core in the plurality of processors/processor cores, such as a main CPU in the plurality of CPUs, or a main CPU core in the plurality of CPU cores) to output the complete log information to the console, and therefore, can prevent the related art problems such as frequent operation of the console and the degrading of system performance due to the waiting caused by adding locking mechanism. In addition, the method and the SoC IC of the present invention can obtain complete log information at any time, and more particularly, can save the complete log information in the file system, and therefore, can prevent the related art problems such as the console being not connected or the console being connected but the logs cannot be checked due to the failure of the console-side host. Additionally, through utilizing the control procedure regarding memory barrier, the present invention can ensure that a single buffer has only one consumer and one producer, to realize the no-lock burst access of first-in-first-out (FIFO), in order to prevent system performance degradation caused by adding locking mechanism and possible deadlock. Since using the global timestamps is introduced, the present invention can provide better system analysis reference information through the gap between the timestamps of adjacent logs. The present invention can also provide reference information for determining whether any log is missing by introducing the serial numbers.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing multi-system log access management, applicable to a system on chip (SoC) integrated circuit (IC), the method comprising:
   utilizing at least one processor of the SoC IC to run multiple systems to control operations of the SoC IC, wherein the at least one processor comprises multiple partial circuits, and the multiple partial circuits respectively run the multiple systems;
   utilizing a first partial circuit of the multiple partial circuits to execute at least one first log management procedure, to configure at least one memory of the SoC IC into multiple ring buffers respectively corresponding to the multiple partial circuits, to record a set of first logs of a first system running on the first partial circuit into a first ring buffer of the multiple ring buffers;
   utilizing at least one second partial circuit of the multiple partial circuits to execute at least one second log management procedure, to record at least one set of second logs of at least one second system running on the at least one second partial circuit into at least one second ring buffer of the multiple ring buffers, wherein the multiple systems comprise the at least one second system;
   initializing a global ring buffer comprising the multiple ring buffers;
   utilizing the first partial circuit to read multiple sets of logs respectively stored in the multiple ring buffers, the multiple sets of logs including the set of first logs in the first ring buffer and the at least one set of second logs in the second ring buffer; and
   utilizing the first partial circuit to write the multiple sets of logs into a file system to form at least one log file for access.

2. The method of claim 1, wherein the set of first logs comprises a serial number of each log in the set of first logs and a log content of said each log in the set of first logs, any set of second logs in the at least one set of second logs comprises a serial number of each log in the any set of second logs and a log content of said each log in the any set of second logs.

3. The method of claim 1, wherein the set of first logs comprises a timestamp of each log in the set of first logs and a log content of said each log in the set of first logs, any set of second logs in the at least one set of second logs comprises a timestamp of each log in the any set of second logs and a log content of said each log in the any set of second logs.

4. The method of claim 1, wherein any log in any set of logs in the multiple sets of logs comprises a timestamp; and the respective timestamps of all logs in the multiple sets of logs are generated according to an identical clock, to indicate relative timing between the multiple sets of logs.

5. The method of claim 1, further comprising:
   utilizing the at least one first log management procedure to configure a first data processing path connected from the first partial circuit to the first ring buffer into a first log writing pipeline;
   utilizing the at least one second log management procedure to configure at least one second data processing path connected from the at least one second partial circuit to the at least one second ring buffer into at least one second log writing pipeline; and
   utilizing the at least one first log management procedure to configure multiple other data processing paths respectively connected from the multiple ring buffers to the first partial circuit into multiple log reading pipelines, and to configure a subsequent data processing path from the first partial circuit toward the file system into a log exporting pipeline.

6. The method of claim 1, wherein based on pipeline processing between the multiple partial circuits and the multiple ring buffers, a data amount of the multiple sets of logs buffered in the multiple ring buffers dynamically changes over time.

7. The method of claim 1, wherein at least two systems of the multiple systems belong to different types of systems, respectively.

8. The method of claim 1, wherein the multiple systems respectively represent multiple operating systems.

9. A system on chip (SoC) integrated circuit (IC), applicable to multi-system log access management, the SoC IC comprising:
   at least one processer, comprising multiple partial circuits, the multiple partial circuits being configured to respectively run multiple systems to control operations of the SoC IC; and
   at least one memory, coupled to the at least one processer, configured to store information for the SoC IC;
   wherein:
   a first partial circuit of the multiple partial circuits executes at least one first log management procedure, to configure the at least one memory into multiple ring buffers respectively corresponding to the multiple partial circuits, to record a set of first logs of a first system running on the first partial circuit into a first ring buffer of the multiple ring buffers;
   at least one second partial circuit of the multiple partial circuits executes at least one second log management procedure, to record at least one set of second logs of at least one second system running on the at least one second partial circuit into at least one second ring buffer of the multiple ring buffers, wherein the multiple systems comprise the at least one second system;
   the processor initializes a global ring buffer comprising the multiple ring buffers;
   the first partial circuit reads multiple sets of logs respectively stored in the multiple ring buffers, wherein the multiple sets of logs include the set of first logs in the first ring buffer and the at least one set of second logs in the second ring buffer, and the first partial circuit writes the multiple sets of logs into a file system to form at least one log file for access.

10. A non-transitory computer-readable medium, storing program codes which cause a system on chip (SoC) integrated circuit (IC) to perform a multi-system log access management procedure when executing the program codes, at least one processor of the SoC IC running multiple systems to control operations of the SoC IC, the at least one processor comprising multiple partial circuits, the multiple partial circuits respectively running the multiple systems, the multi-system log access management procedure comprising:

utilizing a first partial circuit of the multiple partial circuits to execute at least one first log management procedure, to configure at least one memory of the SOC IC into multiple ring buffers respectively corresponding to the multiple partial circuits, to record a set of first logs of a first system running on the first partial circuit into a first ring buffer of the multiple ring buffers; and utilizing at least one second partial circuit of the multiple partial circuits to execute at least one second log management procedure, to record at least one set of second logs of at least one second system running on the at least one second partial circuit into at least one second ring buffer of the multiple ring buffers, wherein the multiple systems comprise the at least one second system;

initializing a global ring buffer comprising the multiple ring buffers;

utilizing the first partial circuit to read multiple sets of logs respectively stored in the multiple ring buffers, the multiple sets of logs including the set of first logs in the first ring buffer and the at least one set of second logs in the second ring buffer; and utilizing the first partial circuit to write the multiple sets of logs into a file system to form at least one log file for access.

* * * * *